US009665937B2

(12) United States Patent
Luo

(10) Patent No.: US 9,665,937 B2
(45) Date of Patent: May 30, 2017

(54) INCREMENTAL GLOBAL NON-RIGID ALIGNMENT OF THREE-DIMENSIONAL SCANS

(71) Applicant: Adobe Systems Incorporated, San Jose, CA (US)

(72) Inventor: Linjie Luo, Marina del Rey, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 114 days.

(21) Appl. No.: 14/803,617

(22) Filed: Jul. 20, 2015

(65) Prior Publication Data

US 2016/0335771 A1     Nov. 17, 2016

Related U.S. Application Data

(60) Provisional application No. 62/162,400, filed on May 15, 2015.

(51) Int. Cl.
*G06T 7/33* (2017.01)
*G06T 7/00* (2017.01)
*G06T 7/593* (2017.01)

(52) U.S. Cl.
CPC .............. *G06T 7/0028* (2013.01); *G06T 7/33* (2017.01); *G06T 7/593* (2017.01); *G06T 2207/10016* (2013.01)

(58) Field of Classification Search
CPC .. G06T 7/33; G06T 7/593; G06T 2207/10016
See application file for complete search history.

(56) References Cited

U.S. PATENT DOCUMENTS 6,097,854 A * 8/2000 Szeliski ................. G06K 9/209
   345/634
6,970,591 B1 * 11/2005 Lyons .................... G06K 9/209
   345/419

(Continued)

OTHER PUBLICATIONS

Brown, et al., "Global Non-Rigid Alignment of 3-D Scans", ACM Transactions on Graphics (Proceedings of ACM SIGGRAPH 2007), vol. 26, No. 3, Article 21 (Jul. 2007).

(Continued)

*Primary Examiner* — Siamak Harandi
*Assistant Examiner* — Mai Tran
(74) *Attorney, Agent, or Firm* — Finch & Maloney PLLC

(57) ABSTRACT

Techniques are provided for incrementally aligning multiple scans of a three-dimensional subject. This can be accomplished by establishing an updated aligned set of scans as each new scan is sequentially processed and aligned with the existing scans. In such embodiments the pairwise and global alignment processes are effectively combined into a single collective alignment process. This collective alignment converges to an optimal alignment faster than the sequential pairwise alignment process that existing solutions use. The collective alignment enforces pairwise alignment between the individual scans in the aligned set of scans. This is because each scan comprising the aligned set can be aligned to the next incremental scan if any scan included in the aligned set can be aligned to the next incremental scan. The pairwise alignment between the scans comprising the aligned set is thus a known function.

20 Claims, 6 Drawing Sheets

(56) References Cited

U.S. PATENT DOCUMENTS

2001/0043738 A1* 11/2001 Sawhney ................ G01S 5/163
                                                  382/154
2012/0306876 A1* 12/2012 Shotton .................. G06T 17/10
                                                  345/424

OTHER PUBLICATIONS

Budd, et al., "Global Non-Rigid Alignment of Surface Sequences", International Journal of Computer Vision, vol. 102, No. 1-3, pp. 256-270 (Mar. 2013).
Igarashi, et al., "As-Rigid-As-Possible Shape Manipulation", ACM Transactions on Graphics (Proceedings of ACM SIGGRAPH 2005), vol. 24, No. 3, pp. 1134-1141 (Jul. 2005).
Li, et al., "3D Self-Portraits", ACM Transactions on Graphics (Proceedings of ACM SIGGRAPH Asia 2013), vol. 32, No. 6, Article 187 (Nov. 2013).
Sumner, et al., "Embedded Deformation for Shape Manipulation", ACM Transactions on Graphics (Proceedings of ACM SIGGRAPH 2007), vol. 26, No. 3, Article 80 (Jul. 2007).
U.S. Appl. No. 14/550,767, filed Nov. 21, 2014.

* cited by examiner

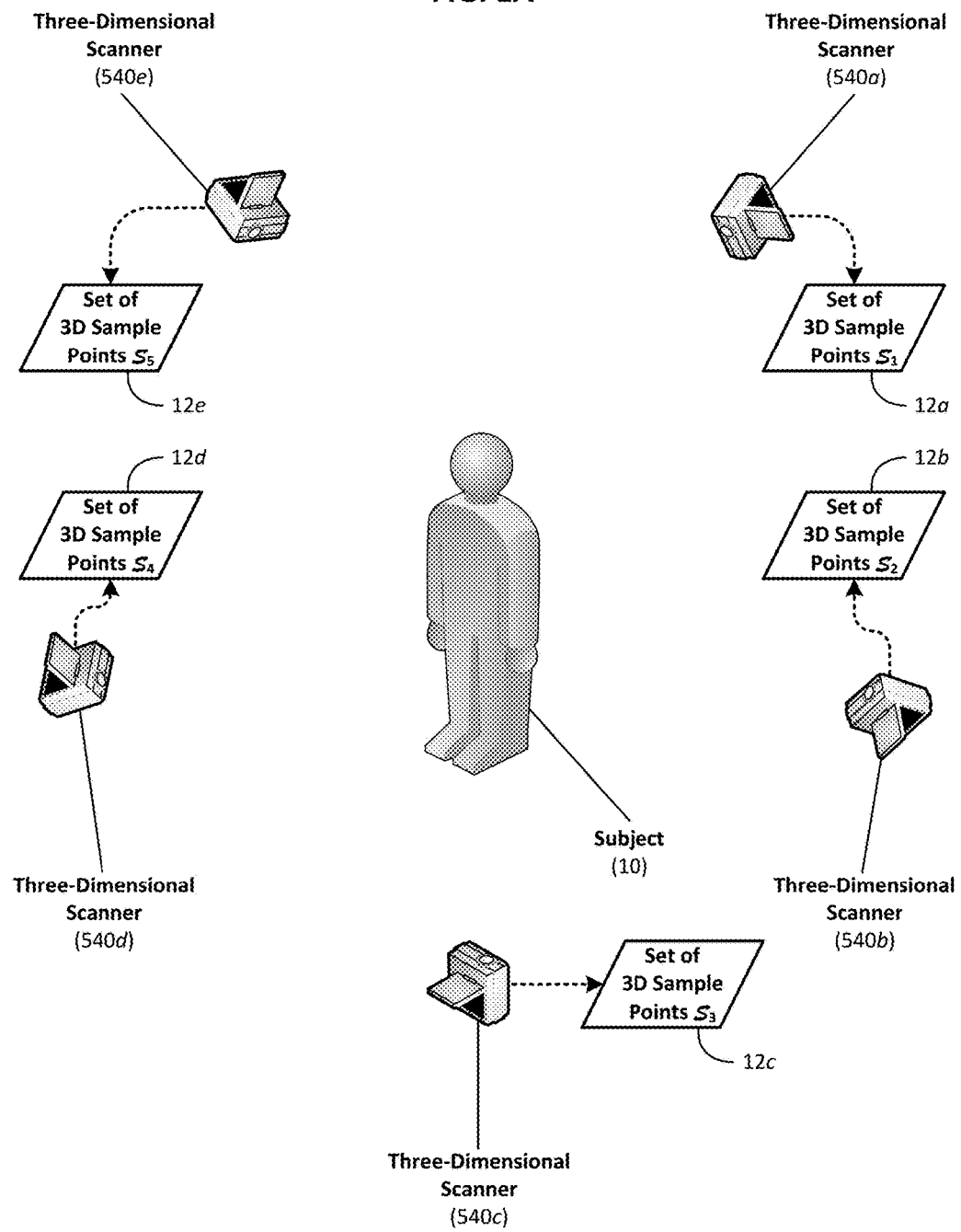

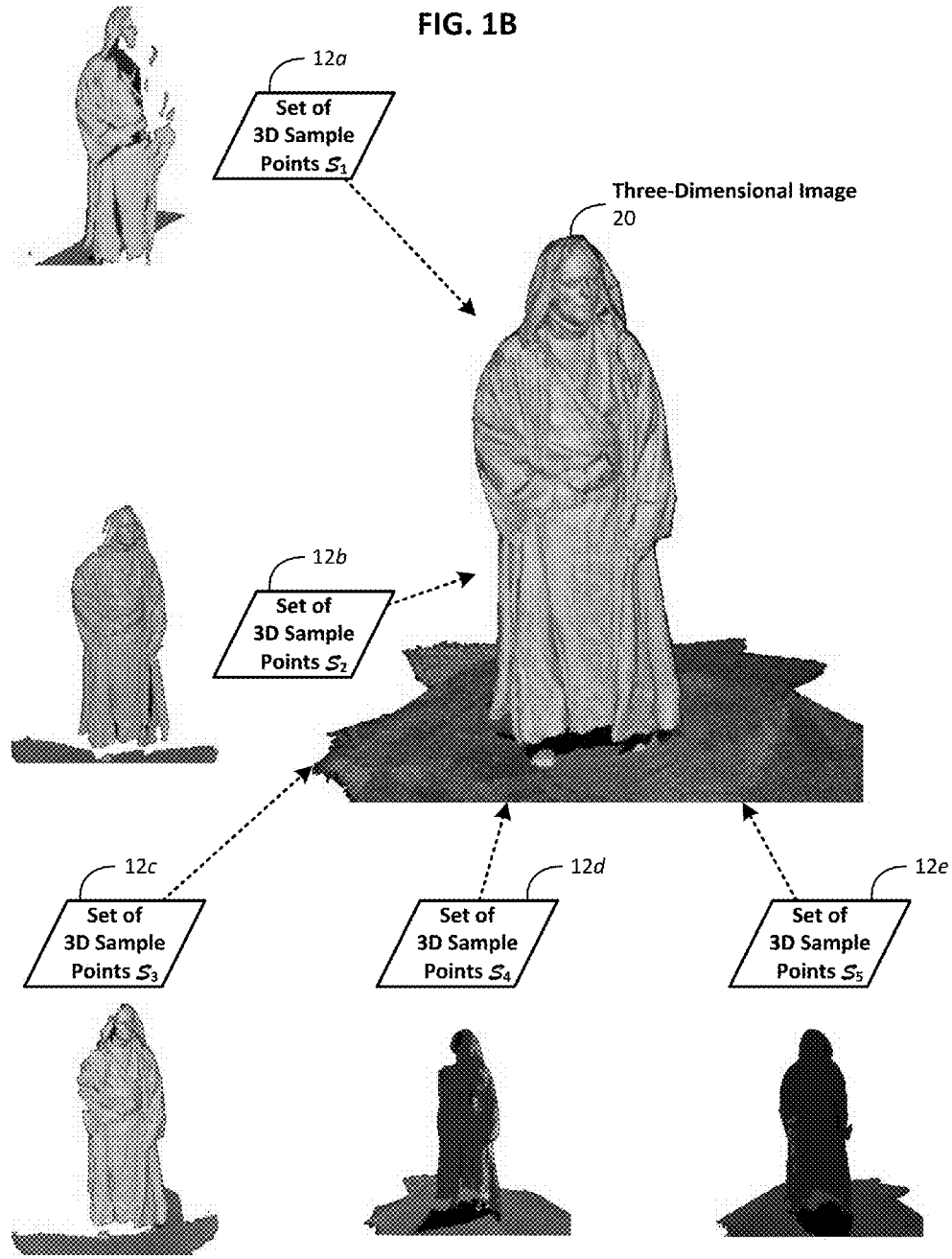

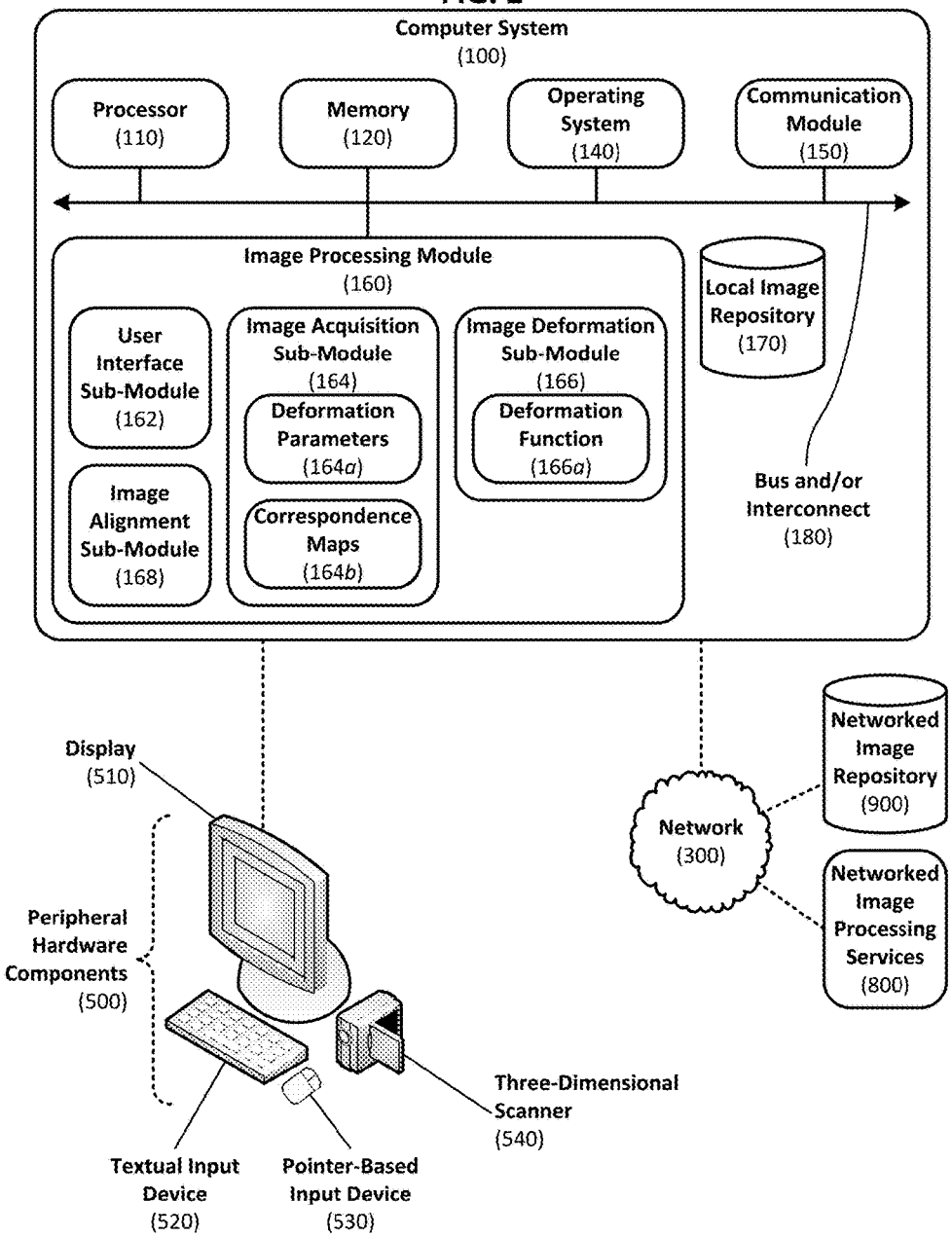

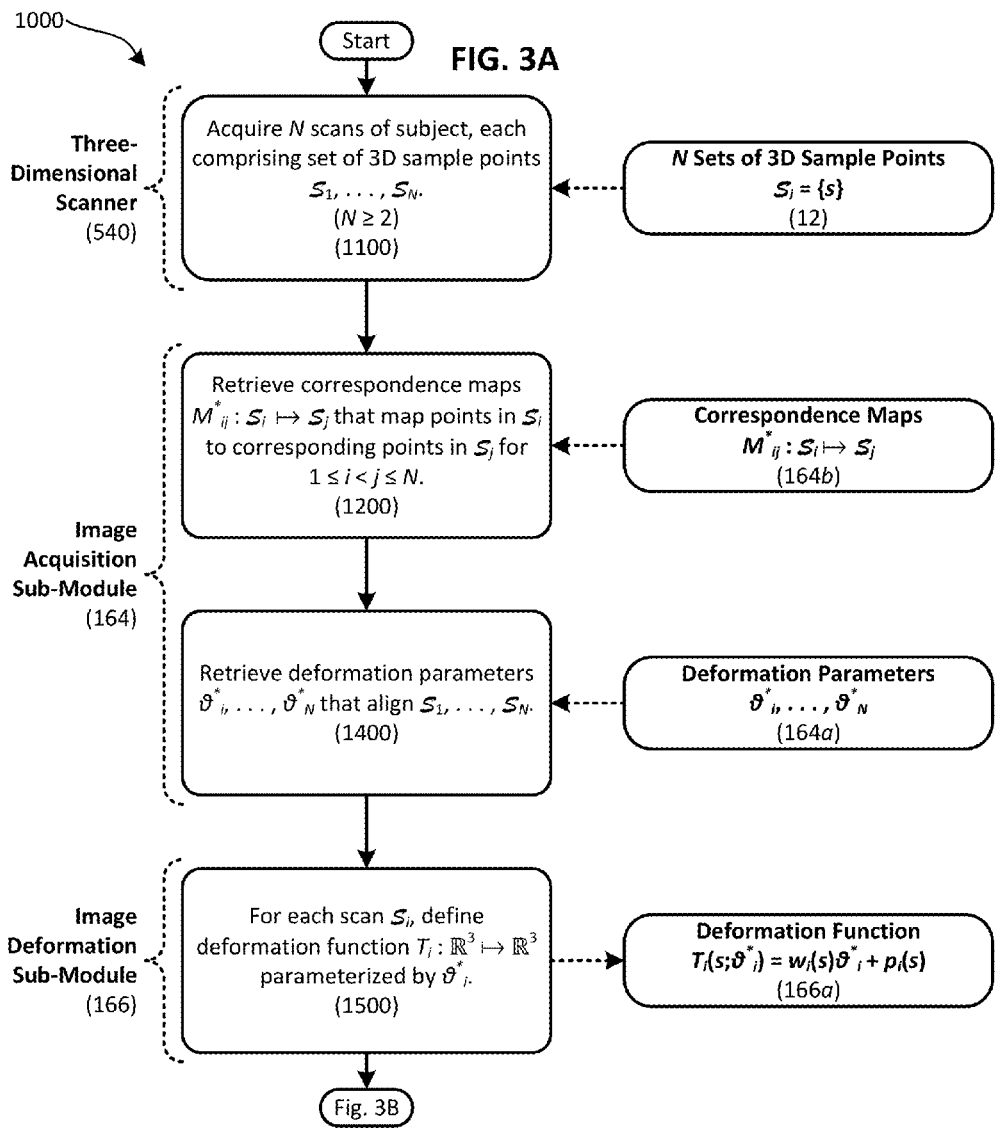

INCREMENTAL GLOBAL NON-RIGID ALIGNMENT OF THREE-DIMENSIONAL SCANS

REFERENCE TO PRIOR APPLICATION

This application claims the benefit of U.S. Provisional Patent Application 62/162,400 (filed 15 May 2015). The entire disclosure of this priority application is hereby incorporated by reference herein.

FIELD OF THE DISCLOSURE

This disclosure relates generally to three-dimensional scanning, and more specifically to techniques for incrementally aligning multiple scans of a three-dimensional subject.

BACKGROUND

Optical scanners have been developed that are capable of generating a three-dimensional image of a physical object or a real-world environment. While limited three-dimensional modeling is possible based on a single scan of the subject, more thorough modeling can be achieved using multiple scans. Multiple scans can be acquired by simultaneously scanning the subject with multiple cameras from different perspectives, or alternatively, by sequentially scanning the subject with a single camera which is moved between scans. In some applications, tens, hundreds, or even thousands of scans may be acquired, depending on the level of detail required in a given application. Once acquired, these multiple scans are brought into a common reference system in a process that is typically referred to as "global alignment", "multi-view alignment", or "registration". In theory, a pair of perfectly calibrated scans could be aligned using a rigid transformation that consists only of translation and rotation. However, as a practical matter, even calibrated scans contain non-rigid distortions due to the accumulation of tracking errors and nonlinear measurement distortions in optical sensors. More significant non-rigid distortions occur when the subject being scanned moves slightly (such as in the case of scanning a living person who is breathing) or when the scanner is moved erratically (such as in the case of a handheld camera). These non-rigid distortions can cause loss of high-frequency details in the resulting three-dimensional image. To counter this, techniques have been developed for "global non-rigid alignment" of three-dimensional scans. One such technique in disclosed by Brown, et al., "Global Non-Rigid Alignment of 3-D Scans", ACM Transactions on Graphics (Proceedings of ACM SIGGRAPH 2007), Vol. 26, No. 3, Article 21 (July 2007) (hereinafter referred to as "Brown, et al.").

BRIEF DESCRIPTION OF THE DRAWINGS

FIG. 1A is a diagram schematically illustrating the collection of five sets of three-dimensional sample points that can be used to generate a three-dimensional image of a subject.

FIG. 1B is a diagram schematically illustrating the use of a global non-rigid alignment technique to stitch together five sets of three-dimensional sample points to generate a three-dimensional image.

FIG. 2 is a block diagram schematically illustrating selected components of an example computer system that can be used to incrementally align multiple scans of a three-dimensional subject.

FIGS. 3A and 3B comprise a flowchart schematically illustrating an example global non-rigid alignment method for incrementally aligning multiple scans of a three-dimensional subject.

DETAILED DESCRIPTION

There is growing demand for increasingly accurate three-dimensional scanning capabilities. This demand is driven, in part, by advances in three-dimensional printing and display technologies. One way of increasing the accuracy of a three-dimensional scanning system with little or no hardware modification is to increase the number of scans used to generate a three-dimensional model. This can be accomplished, for example, by either using an existing scanner to acquire multiple scans, or adding additional scanners which are used to acquire the additional scans. In either case, the accuracy and overall quality of the resulting three-dimensional image can be increased without actually increasing the scanner resolution itself. While increasing the number of acquired scans may be straightforward from a hardware standpoint, existing techniques for aligning the data sets acquired as a result of multiple scans do not scale well. This is because such techniques rely on both an initial pairwise alignment process that identifies corresponding points between all pairs of acquired scans, as well as a subsequent global alignment which minimizes distances between the identified corresponding points. Because corresponding points between all pairs of acquired scans are identified with these existing systems, every pair of acquired scans is analyzed. The pairwise alignment process therefore scales exponentially with the number of scans that are to be aligned. As a result, existing alignment techniques can become prohibitively expensive in terms of processing and memory capacity when applied to a large number of scans. Such techniques are therefore not well suited to implementations that (a) use a device with limited processing or memory capacity, and/or (b) use more than a few input scans. These limitations represent substantial obstacles to using multiple scans to generate a three-dimensional image of a physical object or a real-world environment.

Thus, and in accordance with certain of the embodiments disclosed herein, techniques are provided for incrementally aligning multiple scans of a three-dimensional subject. This can be accomplished by establishing an updated aligned set of scans as each new scan is sequentially processed and aligned with the existing scans. In such embodiments the pairwise and global alignment processes are effectively combined into a single collective alignment process. This collective alignment converges to an optimal alignment faster than the sequential pairwise alignment process that existing solutions often use. The collective alignment enforces pairwise alignment between the individual scans that comprise the aligned set of scans. This is because each scan comprising the aligned set can be aligned to the next incremental scan as long as any one scan included in the aligned set can be aligned to the next incremental scan. The pairwise alignment between the scans comprising the aligned set is thus a known function.

Figure 1C:
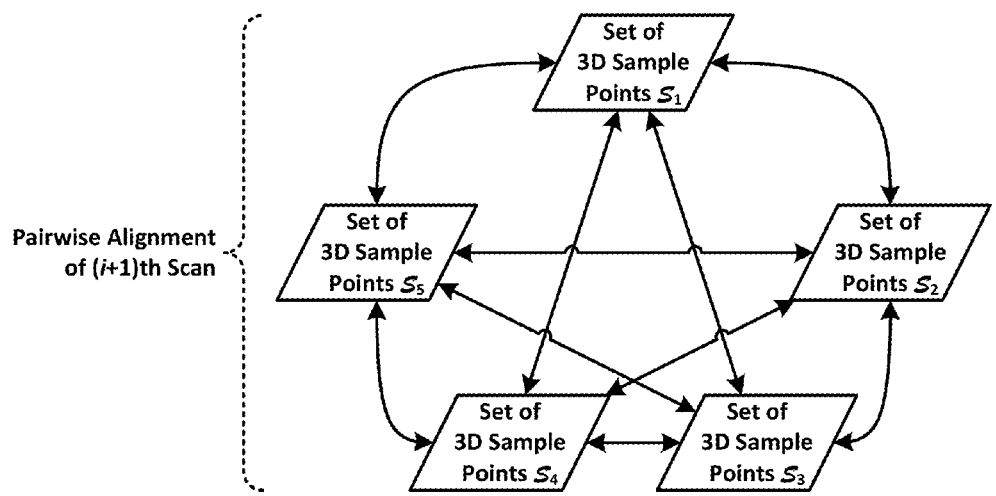
FIG. 1C is a diagram schematically illustrating an existing technique for performing pairwise alignment of an (i+1)th scan as part of a global non-rigid alignment technique.

The advantages of certain of the disclosed embodiments can be better appreciated by way of illustration. In particular, FIG. 1A illustrates an example implementation wherein n=5 three-dimensional scanners (540a, . . . , 540e) are used to acquire a corresponding n sets of three-dimensional sample points $S_1, \ldots, S_n$ (12a, . . . , 12e) that characterize a three-dimensional subject 10. The scanners are illustrated in FIG. 1A as being positioned at various points around subject 10, which is an arrangement that can be accomplished using multiple stationary scanners, a single movable scanner, or some combination thereof. Each individual acquired set of three-dimensional sample points $S_i$ (1≤i≤n) represents a partial view of subject 10, for example characterizing one side of subject 10, or more generally, one perspective of a three-dimensional scene. As illustrated in FIG. 1B, the n sets of three-dimensional sample points $S_1, \ldots, S_n$ can be stitched together to produce a three-dimensional image 20. In one implementation, this stitching process can be accomplished by incrementally performing a global non-rigid alignment of the sample points $S_1, \ldots, S_n$.

As noted previously, existing techniques would have called for the n sets of three-dimensional sample points $S_1, \ldots, S_n$ to be aligned using both an initial pairwise alignment process that identifies corresponding points between all pairs of acquired scans, as well as a subsequent global alignment which minimizes distances between the identified corresponding points. The pairwise alignment process is conceptually illustrated in FIG. 1C, wherein an (i+1)th set of three-dimensional sample points $S_{i+1}$ is pairwise aligned with each of the other i sets of three-dimensional sample points. Aside from being computationally demanding, this requires significant memory resources to maintain characterizations of each of the pairwise alignments. The marginal cost of aligning an additional (i+1)th set of three-dimensional sample points $S_{i+1}$, which can be understood as the marginal cost of scalability, is high because such alignment is based on each of the pairwise alignments of the (i+1) sets of three-dimensional sample points.

Figure 1D:
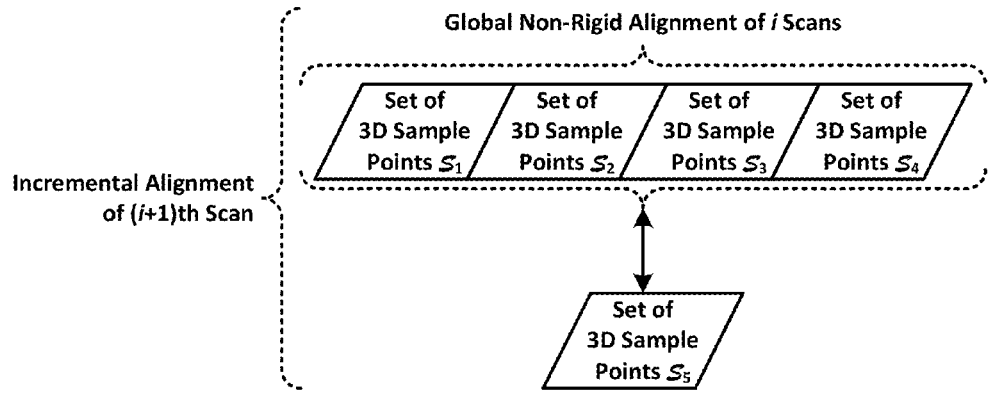
FIG. 1D is a diagram schematically illustrating a technique for performing incremental alignment of an (i+1)th scan as part of a global non-rigid alignment technique.

However, incremental alignment of the n sets of three-dimensional sample points $S_1, \ldots, S_n$ streamlines the alignment process by combining the pairwise and global alignment processes into a single collective alignment process. An updated aligned set of scans is established as each scan is sequentially processed. This collective alignment is conceptually illustrated in FIG. 1D, wherein an (i+1)th set of three-dimensional sample points $S_{i+1}$ is incrementally aligned with an existing set of i aligned scans. This not only reduces the number of computational operations which are undertaken, but it also conserves memory resources by reducing the number of pairwise alignments which are maintained. In this case, the marginal cost of aligning the additional (i+1)th set of three-dimensional sample points $S_{i+1}$ is low because such alignment is based on a combined pairwise and global alignment performed with respect to the single existing set of i aligned scans.

Therefore, unlike existing techniques that use pairwise alignment of multiple scans, the incremental approaches disclosed herein scale linearly with the number of scans that are being aligned. This reduces both processing and memory resources used in performing the alignment. Incrementally adding to an aligned set of scans also makes the resulting technique more robust since each added scan is more likely to have a larger overlap with the aligned set as compared to a single other scan linked in a pairwise alignment. An incremental approach also makes it possible to remove an unwanted scan from the aligned set dynamically, thus providing greater flexibility and an improved user experience as compared to existing systems. The result is an alignment technique that efficiently scales to implementations where a large quantity of scans is acquired. This degree of scalability represents a substantial improvement over existing systems that rely on multiple pairwise alignments.

As used herein, the term "global non-rigid alignment" refers broadly, in addition to its ordinary meaning, to an alignment process that is applied to multiple perspectives of a three-dimensional subject ("global"), wherein the transformation between the multiple perspectives cannot be accurately characterized using only uniformly applied translation and rotation ("non-rigid"). Global alignment aims to align the multiple perspectives in a way that minimizes various properties, such as error accumulation. Non-rigid transformations may be due to, for example, accumulation of tracking errors and nonlinear measurement distortions in optical sensors, as well as slight changes in the size, orientation, shape, or other characteristics of the scanned subject. One example technique for global non-rigid alignment is disclosed in Brown, et al.

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchal format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a table characterizing alignment of two or more sets of three-dimensional sample points defining a scanned subject. Numerous other data structure formats and applications will be apparent in light of this disclosure.

System Architecture

FIG. 2 is a block diagram schematically illustrating selected components of an example computer system 100 that can be used to incrementally align multiple scans of a three-dimensional subject. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communication module 150, an image processing module 160, and a local image repository 170. As can be further seen, a bus and/or interconnect 180 is also provided to allow for inter- and intra-device communications using, for example, communication module 150.

Depending on the particular type of device used for implementation, computer system 100 is optionally coupled to or otherwise implemented in conjunction with, one or more peripheral hardware components 500. Examples of peripheral hardware components 500 include a display 510, a textual input device 520 (such as a keyboard), a pointer-based input device 530 (such as a mouse), and a three-dimensional scanner 540. One or more other input/output devices, such as a touch sensitive display, a speaker, a printer, a printer capable of generating a three-dimensional object (often colloquially referred to as a "3D printer"), or a microphone, can be used in other embodiments. For example, in a particular alternative embodiment wherein computer system 100 is implemented in the form of a tablet computer, certain functionality associated with the particular peripheral hardware components 500 illustrated in FIG. 2 is provided instead by a touch sensitive surface and a camera that form part of the tablet computer. In general, computer system 100 may be coupled to a network 300 to allow for communications with other computing devices or resources, such as networked image processing services 800 and/or a networked image repository 900. Other components and functionality not reflected in the schematic block diagram of FIG. 2 will be apparent in light of this disclosure, and thus it will be appreciated that other embodiments are not limited to any particular hardware configuration.

Examples of devices that can be used to implement three-dimensional scanner 540 include a video camera, a handheld scanner, a copier, a camera, and a mobile computing device such as a smartphone. Regardless of the particular hardware used, three-dimensional scanner 540 is configured to generate a set of three-dimensional sample points $S_i = \{s\}$ that characterize the scanned subject, and that may be stored on, and further processed by, computer system 100. In one implementation, these sample points are generated using an array of optical sensors. In an alternative implementation, one or more sets of three-dimensional sample points $S_i$ can be obtained in other ways such as by downloading from a networked resource, accessing from a computer readable medium, and the like. For example, in one implementation one or more sets of three-dimensional sample points $S_i$ can be acquired from local image repository 170 and/or networked image repository 900.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, a universal serial bus (USB) drive, flash memory, and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Communication module 150 can be any appropriate network chip or chipset which allows for wired and/or wireless connection to other components of computer system 100, and/or to network 300, thereby enabling computer system 100 to communicate with other local and/or remote computer systems, servers, and resources.

Image processing module 160 is configured to process and align multiple sets of three-dimensional sample points and generate a three-dimensional representation of a scanned subject. In an example embodiment the sample points are acquired by three-dimensional scanner 540, and the three-dimensional representation of the scanned subject is rendered using display 510 and/or a 3D printer. In certain embodiments image processing module 160 is installed local to computer system 100, as shown in the example embodiment illustrated in FIG. 2. However in alternative embodiments computer system 100 is implemented in a client-server environment wherein at least some portion of image processing module 160 is provided to computer system 100 using an applet, such as a JavaScript applet, or other downloadable module. Such a remotely-provisioned module can be provided in real-time in response to a request from computer system 100 for access to a server having resources that are of interest to, or are otherwise sought by, the user of computer system 100. Examples of such resources include networked image processing services 800 and/or networked image repository 900, the latter of which may include imagery and/or data sets that the user wishes to manipulate. Such implementations are particularly useful where computer system 100 has limited processing capacity, such as in the case of a tablet computer or smartphone, thereby allowing smaller, less powerful devices to harness the processing capacity and functionality associated with a larger computing system. The server, if applicable, may be local to network 300 or may be remotely coupled to network 300 by one or more other networks or communication channels. In any such standalone or networked computing scenarios, image processing module 160 can be implemented using any suitable combination of technologies that allow a user to interface with computer system 100. In one particular example embodiment, image processing module 160 is provided by a digital image editing software application such as Adobe® Photoshop® (Adobe Systems Incorporated, San Jose, Calif.).

In certain embodiments image processing module 160 includes a user interface sub-module 162 configured to receive user input that controls or otherwise manipulates the functionality disclosed herein. For example, user interface sub-module 162 can be used to control how an aligned three-dimensional image is presented to a user, such as via rendering on display device 510 or with a 3D printer. Functionality associated with user interface sub-module 162 can be implemented using any of a wide variety of suitable user interface elements, examples of which may include dialog boxes, control panels, display windows, pointer elements, menu bars, toolbars, dropdown menus, and context menus.

Still referring to the example embodiment illustrated in FIG. 2, image processing module 160 also includes an image acquisition sub-module 164. Image acquisition sub-module 164 is configured to receive multiple sets of three-dimensional sample points and store additional data characterizing these received data sets. For example, in one implementation image acquisition sub-module 164 stores correspondence maps 164b that map points in a first set of three-dimensional sample points $S_i$ to corresponding points in a second set of three-dimensional sample points $S_j$, wherein $1 \leq i < j \leq N$, and wherein N is a total quantity of acquired sets of three-dimensional sample points. Image acquisition sub-module 164 can additionally or alternatively store deformation parameters 164a that can be used to model deformations in the subject being scanned, and therefore that can be used to align the N sets of three-dimensional sample points $S_1, \ldots, S_N$. In one embodiment, deformation parameters 164a and correspondence maps 164b are generated by an image alignment sub-module 168, as will be described in turn.

In certain embodiments image processing module 160 further includes an image deformation sub-module 166 that is configured to define a deformation function 166a, which is parameterized by deformation parameters 164a. In one embodiment the deformation function used to model deformations associated with the ith set of three-dimensional sample points $S_i$ is a linear function $T_i : \mathbb{R}^3 \mapsto \mathbb{R}^3$, wherein $T_i$ is defined by $$T_i(s;\theta_i) = w_i(s)\theta + p_i(s). \tag{1}$$

Here s is one of the three-dimensional sample points included in the ith acquired set of three-dimensional sample points $S_i$, $\theta_i$ is the deformation parameter associated with the ith scan of the subject, $w_i(s)$ are deformation weights for point s, and $p_i(s)$ is the three-dimensional position of s. Other nonlinear deformation functions can be used in other embodiments. In some cases image deformation sub-module 166 may include a plurality of different deformation functions 166a which can be invoked in different applications, optionally based on input received via user interface sub-module 162.

Referring again to the example embodiment illustrated in FIG. 2, image processing module 160 further includes an image alignment sub-module 168 that is configured to concurrently update the deformation parameters and the correspondence maps based on an incrementally-processed set of three-dimensional sample points $S_{i+1}$. This can be accomplished by establishing an updated aligned set of three-dimensional sample points as each acquired set of sample points is sequentially processed and aligned with the previously processed sets. Once established, the updated deformation parameters and correspondence maps can be provided to image acquisition sub-module 164 for subsequent processing of additional sets of three-dimensional sample points. Image alignment sub-module 168 is optionally further configured to stitch together the aligned set of three-dimensional sample points to produce a global non-rigid alignment that user interface sub-module 162 can use to render a three-dimensional image.

Computer system 100 optionally includes local image repository 170 which comprises locally scanned images, sets of three-dimensional sample points, and/or three-dimensional images. Local image repository 170 can be implemented using any suitable type of digital storage, such as a USB drive, a memory card, or a disc drive. In alternative embodiments computer system 100 is additionally or alternatively in communication with networked image repository 900, which comprises remotely stored scanned images, sets of three-dimensional sample points, and/or three-dimensional images. In certain embodiments networked image repository 900 is implemented in the form of cloud storage. In embodiments wherein network 300 comprises a local network, such as a Bluetooth or Wi-Fi connection between computer system 100 and a handheld scanner, networked image repository 900 comprises a memory resource provided by the scanner itself. In some implementations image processing module 160 is configured to access both local and networked image repositories to acquire sets of three-dimensional sample points which are to be aligned.

Computer system 100 can communicate with the various networked services and resources described herein via network 300. Network 300 may be a local area network (such as a home-based or office network), a wide area network (such as the Internet), a peer-to-peer network, or a combination of such networks, whether public, private, or both. For example, in certain embodiments at least a portion of the functionality associated with network 300 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the global non-rigid alignment methodologies described herein to be implemented. The instructions can be encoded using any suitable programming language, such as C, C++, object-oriented C, JavaScript, Visual Basic .NET, or alternatively, using custom or proprietary instructions sets. Such instructions can be provided in the form of one or more computer software applications and/or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as image editing software applications, desktop publishing applications, computer-aided design applications, presentation applications, or word processing applications. For example, a word processing application can be configured to manipulate three-dimensional images that are to be incorporated into a word processing document. The word processing application can therefore be configured to implement certain of the functionalities disclosed herein to facilitate such three-dimensional image manipulation. The computer software applications described herein may include a number of different modules, sub-modules, or other components of distinct functionality, and can provide information to, or receive information from, still other components and services. These modules can be used, for example, to communicate with peripheral hardware components 500, networked storage resources such as networked image repository 900, or other external components. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative subcomponents.

The aforementioned non-transitory computer readable medium may be any suitable medium for storing digital information, such as a hard drive, a server, a flash memory, and/or RAM. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/ output ports for receiving and outputting data, and a number of embedded routines for carrying out the various functionalities disclosed herein. It will be apparent that any suitable combination of hardware, software, and/or firmware can be used, and that the present disclosure is not intend to be limited to any particular system architecture.

Methodology

Figure 3B:
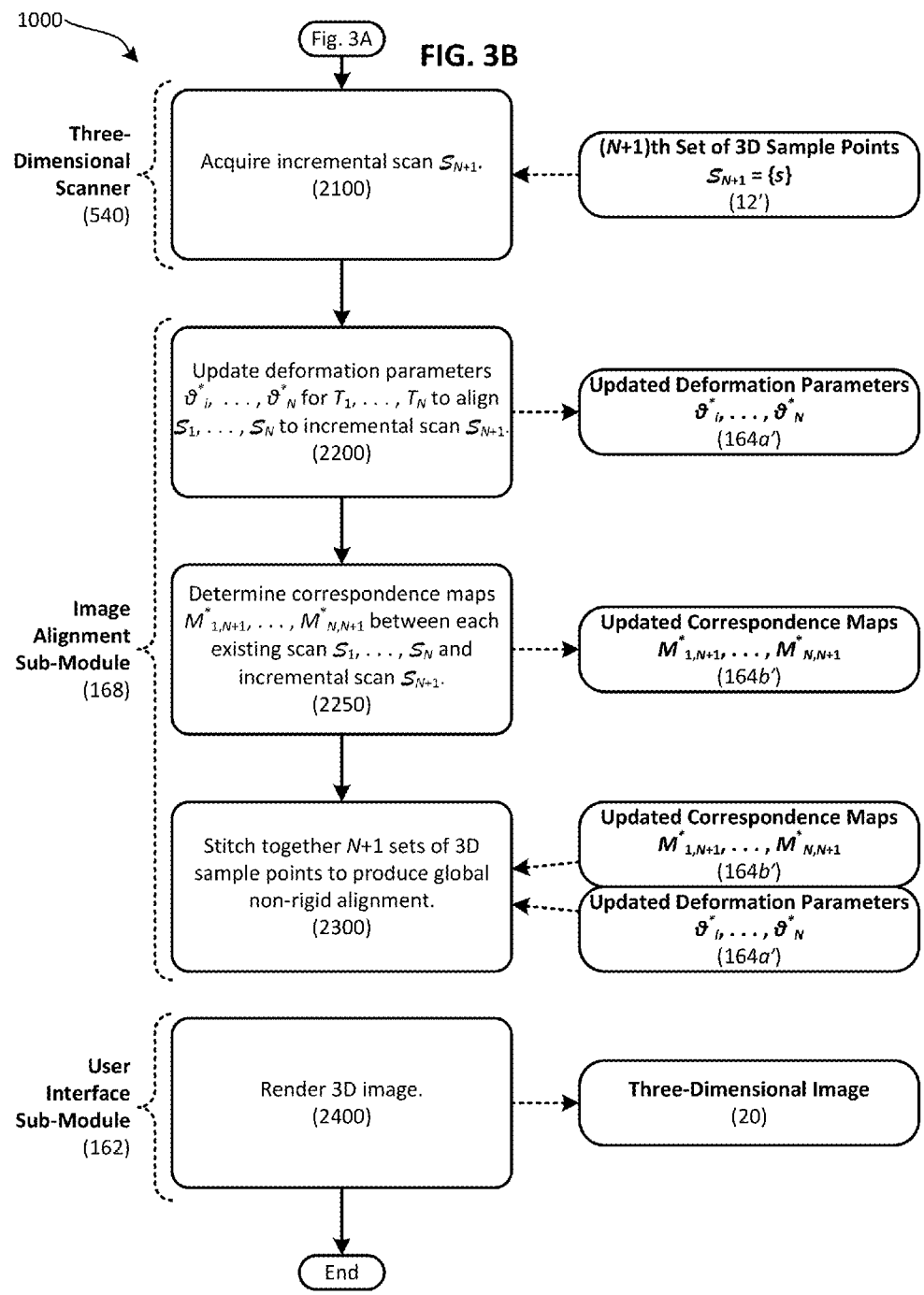

FIGS. 3A and 3B comprise a flowchart schematically illustrating an example global non-rigid alignment method 1000 for incrementally aligning multiple scans of a three-dimensional subject. As can be seen, global non-rigid alignment method 1000 includes a number of phases and sub-processes, the sequence of which may vary from one embodiment to another. However, when considered in the aggregate, these phases and sub-processes form a complete alignment technique that is responsive to user input in accordance with certain of the embodiments disclosed herein. Global non-rigid alignment method 1000 can be implemented, for example, using the system architecture illustrated in FIG. 2 and described herein. However, other system architectures can be used in other embodiments, as will be apparent in light of this disclosure. To this end, the correlation of the various functionalities illustrated in FIGS. 3A and 3B to the specific components illustrated in FIG. 2 is not intended to imply any structural and/or use limitations. Rather other embodiments may include varying degrees of integration wherein multiple functionalities are effectively performed by one system or module. For example, in an alternative embodiment a single module is used to provide image acquisition and deformation analysis. Thus other embodiments may have fewer or more modules depending on the granularity of implementation. Numerous variations and alternative configurations will be apparent in light of this disclosure.

As illustrated in FIG. 3A, global non-rigid alignment method 1000 can be understood as commencing upon acquisition of N scans of subject 10, each comprising a set of three-dimensional sample points $\mathcal{S}_1, \ldots, \mathcal{S}_N$ (12). See reference numeral 1100 in FIG. 3A. Here N≥2 since a single scan would not be aligned with itself. In some cases N≥3. A given set of three-dimensional sample points $\mathcal{S}_i=\{s\}$ characterize the appearance of subject 10 from a given perspective. In one embodiment three-dimensional scanner 540 is used to acquire the N scans, although in other embodiments the N sets of three-dimensional sample points $\mathcal{S}_1, \ldots, \mathcal{S}_N$ is alternatively acquired from a memory resource, such as local image repository 170 or networked image repository 900.

Image acquisition sub-module 164 can be configured to retrieve a set of optimized correspondence maps $M_{ij}^*: \mathcal{S}_i \mapsto \mathcal{S}_j$ (164b) that map points in $\mathcal{S}_i$ to corresponding points in $\mathcal{S}_j$ for various (i,j) pairings of the N sets of three-dimensional sample points $\mathcal{S}_1, \ldots, \mathcal{S}_N$. See reference numeral 1200 in FIG. 3A. Thus 1≤i<j≤N. As used herein, an "optimized" correspondence map $M_{ij}^*$ refers to a mapping of points between $\mathcal{S}_i$ and $\mathcal{S}_j$ that minimizes or otherwise reduces overall alignment error while distributing such error evenly across the aligned region. Image acquisition sub-module 164 can also be configured to retrieve a set of optimized deformation parameters $\theta_1^*, \ldots, \theta_N^*$ (164a). See reference numeral 1400 in FIG. 3A. An ith deformation parameter $\theta_i^*$ can be understood as defining a deformation of the sample points comprising $\mathcal{S}_i$ based on a corresponding deformation function $T_i$. Such a deformation can be used to more precisely or optimally align the acquired N sets of three-dimensional sample points $\mathcal{S}_1, \ldots, \mathcal{S}_N$. More specifically, as used herein, "optimized" deformation parameters $\theta_1^*, \ldots, \theta_N^*$ refer to a set of parameters that provides a preferred mapping of the N set of three-dimensional sample points that corresponds to the set of optimized correspondence maps $M_{ij}^*$. Where N=2, the optimized correspondence map $M_{12}^*$ and the set of optimized deformation parameters $\{\theta_1, \theta_2\}$ can be determined based on any suitable alignment technique such as the global non-rigid alignment techniques disclosed in Brown, et al. Where N≥3, the optimized correspondence map $M_{ij}^*$ and the set of optimized deformation parameters $\theta_1^*, \ldots, \theta_N^*$ can be retrieved from a previous incremental alignment iteration, as will be disclosed in turn. This provides method 1000 with a degree of recursiveness since the output of a first iteration can serve as the input to a subsequent iteration. While FIG. 3A illustrates that the correspondence maps $M_{ij}^*$ are obtained before the deformation parameters $\theta_1^*, \ldots, \theta_N^*$, the sequence of these operations is not critical and in other embodiments this information can be obtained in a different sequence or concurrently.

Once the optimized correspondence maps $M_{ij}^*$ and deformation parameters $\theta_1^*, \ldots, \theta_N^*$ have been obtained, image deformation sub-module 166 can be configured to define the deformation function $T_i: \mathbb{R}^3 \mapsto \mathbb{R}^3$ (166a) that is parameterized by $\theta_i^*$. See reference numeral 1500 in FIG. 3A. In such embodiments deformation function 166a is defined by an underlying deformation model, examples of which include graph-based deformation and as-rigid-as-possible deformation. Additional details about graph-based deformation models are provided by Sumner, et al., "Embedded Deformation for Shape Manipulation", ACM Transactions on Graphics (Proceedings of ACM SIGGRAPH 2007), Vol. 26, No. 3, Article 80 (July 2007). Additional details about as-rigid-as-possible deformation models are provided by Igarashi, et al., "As-Rigid-As-Possible Shape Manipulation", ACM Transactions on Graphics (Proceedings of ACM SIGGRAPH 2005), Vol. 24, No. 3, pp. 1134-1141 (July 2005). In one embodiment deformation function 166a is a linear function defined by Equation (1) wherein $\theta_i = \theta_i^*$. The optimized correspondence maps $M_{ij}^*$, the deformation parameters $\theta_1^*, \ldots, \theta_N^*$, and the corresponding deformation functions $T_i$ can be understood as defining an initial alignment of the N sets of three-dimensional sample points $\mathcal{S}_1, \ldots, \mathcal{S}_N$.

After the foregoing processing has been applied to the N sets of three-dimensional sample points $\mathcal{S}_1, \ldots, \mathcal{S}_N$, an incremental (N+1)th scan of subject 10 can be acquired. See reference numeral 2100 in FIG. 3B. In one embodiment three-dimensional scanner 540 is used to acquire the incremental (N+1)th scan, although in other embodiments the (N+1)th set of three-dimensional sample points $\mathcal{S}_{N+1}$ (12') is alternatively acquired from a local or networked memory resource. For example, in one implementation the N and (N+1)th scans may be acquired simultaneously, but may be processed sequentially as illustrated in FIGS. 3A and 3B. Given the (N+1)th set of three-dimensional sample points $\mathcal{S}_{N+1}$, image alignment sub-module 168 can be configured to update the deformation parameters $\theta_1^*, \ldots, \theta_N^*$ for corresponding deformation functions $T_1, \ldots, T_N$ such that $\mathcal{S}_1, \ldots, \mathcal{S}_N$ are aligned with $\mathcal{S}_{N+1}$. See reference numeral 2200 in FIG. 3B. This results in a new set of updated deformation parameters $\theta_1^*, \ldots, \theta_N^*$ (164a'). Image alignment sub-module 168 can also be configured to supplement the existing correspondence maps $M_{ij}^*$ (1≤i<j≤N) between the existing N sets of three-dimensional sample points $\mathcal{S}_1, \ldots, \mathcal{S}_N$ so as to produce an updated set of correspondence maps that includes $M_{1,N+1}, \ldots, M_{N,N+1}^*$ (164b'). See reference numeral 2250 in FIG. 2B. The updated set of correspondence maps provides a mapping between each of the existing N sets of sample points to the incremental (N+1)th set of sample points. The updated deformation parameters and the new correspondence maps enable the existing N sets of three-dimensional sample points $S_1, \ldots, S_N$ to be aligned with the newly acquired (N+1)th set of three-dimensional sample points $S_{N+1}$. Image alignment sub-module 168 is configured to generate the updated deformation parameters and the new correspondence maps simultaneously.

Existing techniques for determining the updated deformation parameters and the new correspondence maps use a two-step process. An initial pairwise alignment calculates optimized correspondence maps $M_{1,N+1}^*, \ldots, M_{N,N+1}^*$ for the newly acquired (N+1)th set of three-dimensional sample points $S_{N+1}$. This is accomplished by minimizing the pairwise alignment energy $$M_{i,N+1}^* = \underset{M_{i,N+1}}{\operatorname{argmin}}\left(\min_{\theta_i}\varepsilon_i(M_{i,N+1}, \theta_i)\right) + \lambda f^2(\theta_i). \tag{2}$$

Here $\epsilon_i(M_{i,N+1}, \theta_i)$ represents a unitary alignment energy that corresponds to a sum of distances between (a) sample points that comprise the ith scan and that are transformed by the deformation function defined for the ith scan, and (b) sample points correlated by a correspondence map $M_{i,N+1}$. This unitary alignment energy is represented by $$\varepsilon_i(M_{i,N+1}, \theta_i) = \sum_{s \in S_i} \|T_i(s; \theta_i) - p_{N+1}(M_{i,N+1}(s))\|^2. \tag{3}$$

The term $f^2(\theta_i)$ represents a deformation energy that penalizes non-rigid deformation of $T_i$, and $\lambda$ is the weight for this deformation energy term. The pairwise alignment energy provided by Equation (2) can be optimized by alternating the optimization between $M_{i,N+1}$ and $\theta_i$. In particular, it can be assumed that $M_{i,N+1}$ is known by mapping the points in $S_i$ to the corresponding closest points in $S_{i+1}$, and then optimizing for $\theta_i$. Once this is complete, $\theta_i$ can be fixed and $M_{i,N+1}$ can be updated using the new $\theta_i$. This process can be repeated iteratively until convergence at optimized correspondence maps $M_{1,N+1}^*, \ldots, M_{N,N+1}^*$. At this point, a subsequent global alignment process is used to calculate the optimal deformation parameters $\theta_1^*, \ldots, \theta_N^*$ as follows:

$$\theta_1^*, \ldots, \tag{4}$$

$$\theta_N^* = \underset{\theta_1, \ldots, \theta_N}{\operatorname{argmin}} \sum_{i=1}^{N} (\varepsilon_i(M_{i,N+1}^*, \theta_i) + \lambda f^2(\theta_i)) + \sum_{1 \leq i < j \leq N} \varepsilon_{ij}(M_{ij}^*, \theta_i, \theta_j),$$

where $\epsilon_{ij}(M_{ij}^*, \theta_i, \theta_j)$ is defined as the pairwise alignment energy that enforces the optimal correspondence maps $M_{ij}^*$ between the existing N sets of three-dimensional sample points $S_1, \ldots, S_N$, as represented by $$\varepsilon_{ij}(M_{ij}^*, \theta_i, \theta_j) = \sum_{(s_k, t_k) \in M_{ij}^*} \|T_i(s_k; \theta_i) - T_j(t_k; \theta_j)\|^2. \tag{5}$$

Thus, using such existing techniques, N pairwise optimization problems are solved using Equation (2), followed by one global optimization using Equation (4). This is inefficient, particularly when N is large.

As disclosed herein, and in contrast to existing alignment techniques, image alignment module 168 can be configured to simultaneously (a) update the deformation parameters $\theta_1^*, \ldots, \theta_N^*$ for respective deformation functions $T_1, \ldots, T_N$ such that $S_1, \ldots, S_N$ are aligned with $S_{N+1}$, as well as (b) update the correspondence maps $M_{ij}^*$ ($1 \leq i < j \leq N$) between the existing N sets of three-dimensional sample points $S_1, \ldots, S_N$ so as to produce an updated set of correspondence maps $M_{1,N+1}^*, \ldots, M_{N,N+1}^*$ (164b'). These updates can be performed concurrently as follows:

$$\theta_1^*, \ldots, \theta_N^*; M_{1,N+1}^*, \ldots, \tag{6}$$

$$M_{N,N+1}^* = \underset{\substack{\theta_1, \ldots, \theta_N \\ M_{1,N+1}, \ldots, M_{N,N+1}}}{\operatorname{argmin}} \sum_{i=1}^{N} (\varepsilon_i(M_{i,N+1}, \theta_i) + \lambda f^2(\theta_i)) + \sum_{1 \leq i < j \leq N} \varepsilon_{ij}(M_{ij}^*, \theta_i, \theta_j).$$

Equation (6) can be seen as adding the pairwise alignment energy between the aligned scans as a regularization term to Equation (2). This regularization respects the optimized correspondence maps and alignments that had previously been found between the N scans, thus eliminating any need to perform pairwise alignment between each pair comprising the N+1 scans. Each scan comprising the aligned set of N scans can be aligned to the next incremental (N+1)th scan as long as any one scan included in the aligned set can be aligned to the next incremental scan. This allows the initial alignment to be modified based on the incremental scan. In contrast, optimizing Equation (2) separately for each of the N scans without using pairwise alignment cues retards convergence. Furthermore, aligning the scans collectively also increases the chance of obtaining an accurate alignment since each added scan is more likely to have a larger overlap with the aligned set as compared to a single other scan linked in a pairwise alignment. The overall alignment process is less likely to fail where large overlaps between aligned scans are present. Equation (6) can also be used to remove a scan from an aligned set of N scans by removing the alignment energy term, the pairwise alignment energy term, and the deformation energy term associated with the sample data points which are to be removed. In certain applications processing of an additional (N+1)th scan results in generation of an additional optimized deformation parameter $\theta_{N+1}^*$.

Once the deformation parameters $\theta_1^*, \ldots, \theta_N^*$ and the updated set of correspondence maps $M_{1,N+1}^*, \ldots, M_{N,N+1}^*$ are determined, image alignment sub-module 168 is optionally further configured to stitch together the N+1 sets of three-dimensional sample points to produce a global non-rigid alignment of such sample points. See reference number 2300 in FIG. 3B. This alignment can be leveraged by user interface sub-module 162 to render three-dimensional image 20. Alternatively, the process of acquiring and aligning an additional scan, for example as defined by $S_{N+2}$, is optionally repeated for each available scan. Unlike existing systems that require pairwise alignment of every combination of available three-dimensional sample point sets, and therefore are associated with an exponentially increasing processing burden, the marginal processing burden associated with incrementally aligning the third scan is the same as aligning the thousandth scan.

The following implementation illustrates this point. In this implementation n=9 scans were acquired of a three-dimensional subject. Each scan had approximately 400,000 three-dimensional sample points. Using an existing global non-rigid alignment technique wherein a pairwise alignment between each of the n=9 scans was calculated (such as conceptually illustrated in FIG. 1C), the duration of the alignment was 195 seconds, 168 seconds of which was dedicated to the initial pairwise alignment step. This alignment consumed 105 megabytes of memory. In contrast, the same n=9 scans were aligned using the combined pairwise and global alignment process illustrated in FIGS. 3A and 3B. In this case the duration of the alignment was only 84 seconds. This alignment consumed 2.8 megabytes of memory. These results represent a 57% reduction in processing time and a 97% reduction in memory consumption. In certain embodiments concurrently updating the deformation parameters and the correspondence maps results in between a 40% and a 80% reduction, between a 50% and a 60% reduction, or between a 55% and 60% reduction in processing time as compared to performing separate pairwise and global alignment steps. In certain embodiments concurrently updating the deformation parameters and the correspondence maps results in between a 70% and a 99.9% reduction, between a 80% and a 99% reduction, or between a 90% and a 98% reduction in memory consumption as compared to performing separate pairwise and global alignment steps.

Further Example Embodiments

Numerous variations and configurations will be apparent in light of this disclosure. For instance one example embodiment provides a computer-implemented method for aligning multiple scans of a three-dimensional subject. The method comprises acquiring a plurality of scans. Each of the plurality of scans characterizes a portion of the three-dimensional subject. Each of the plurality of scans comprises a collection of sample points. The method further comprises defining an initial set of correspondence maps. The initial set correlates sample points included in the plurality of scans. The method further comprises defining an initial set of deformation parameters that align the plurality of scans according to a plurality of deformation functions. The initial set of correspondence maps and the initial set of deformation parameters collectively define an initial alignment of the plurality of scans. The method further comprises acquiring an incremental scan that comprises an incremental collection of sample points. The method further comprises concurrently (a) updating the initial set of deformation parameters to modify the initial alignment based on the incremental scan, and (b) defining an updated set of correspondence maps. The updated set of correspondence maps correlate sample points in the plurality of scans to sample points in the incremental scan. In some cases (a) concurrently (i) updating the initial set of deformation parameters and (ii) defining the updated set of correspondence maps comprises solving Equation (6); (b) the plurality of scans includes N scans; (c) $M_{ij}^*$ represents a correspondence map correlating sample points in an ith scan with sample points in a jth scan, $1 \leq i < j \leq N$; (d) $\epsilon_i(M_{i,N+1}, \theta_i)$ represents a unitary alignment energy that corresponds to a sum of distances between (i) sample points that comprise the ith scan and that are transformed by a deformation function defined for the ith scan, and (ii) sample points correlated by a correspondence map $M_{i,N+1}$; (e) $f^2(\theta_i)$ represents a deformation energy that penalizes non-rigid deformation of the deformation function defined for the ith scan; (f) $\lambda$ is a weight of the deformation energy; and (g) $\Sigma_{ij}(M_{ij}^*, \theta_i, \theta_j)$ is a pairwise alignment energy that enforces the correspondence maps $M_{ij}^*$ between the N scans. In some cases the initial set of correspondence maps minimizes an overall alignment error between pairings of the plurality of scans. In some cases (a) the plurality of scans and the incremental scan are acquired using a three-dimensional scanner configured to scan the three-dimensional object; and (b) each of the sample points in each of the collections of sample points is a three-dimensional sample point. In some cases (a) the initial set of deformation parameters are saved in a memory; and (b) updating the initial set of deformation parameters further comprises saving a modified set of deformation parameters in the memory. In some cases (a) an ith one of the plurality of deformation functions is defined as $T_i(s; \theta_i^*) = w_i(s)\theta_i^* + p_i(s)$; (b) s is a selected sample point comprising an ith scan; (c) $w_i(s)$ is a deformation weight of sample point s; (d) $p_i(s)$ is a three-dimensional position of sample point s; and (e) $\theta_i^*$ is a deformation parameter associated with the ith deformation function. In some cases the plurality of scans and the incremental scan are acquired simultaneously. In some cases (a) the plurality of scans includes N scans; (b) acquiring the incremental scan comprises acquiring an (N+1)th scan; (c) updating the initial set of deformation parameters results in N updated deformation parameters; and (d) the method further comprises (i) acquiring a second (N+2)th incremental scan that comprises an (N+2)th incremental collection of sample points; and (ii) concurrently (1) further updating each of the N updated deformation parameters based on alignment of sample points comprising each of the (N+1) scans with the (N+2)th incremental collection of sample points, and (2) defining a second updated set of correspondence maps, the second updated set correlating sample points in the (N+1) scans to sample points in the (N+2)th incremental scan.

Another example embodiment provides an incremental global non-rigid alignment system. The system comprises a memory device. The system further comprises and a processor that is operatively coupled to the memory device. The processor is configured to execute instructions stored in the memory device that, when executed, cause the processor to carry out a scan alignment process. The process comprises acquiring a plurality of scans. Each of the plurality of scans characterizes a portion of the three-dimensional subject. Each of the plurality of scans comprises a collection of sample points. The process further comprises defining an initial set of correspondence maps. The initial set correlates sample points included in the plurality of scans. The process further comprises defining an initial set of deformation parameters that align the plurality of scans according to a plurality of deformation functions. The initial set of correspondence maps and the initial set of deformation parameters collectively define an initial alignment of the plurality of scans. The process further comprises acquiring an incremental scan that comprises an incremental collection of sample points. The process further comprises concurrently (a) updating the initial set of deformation parameters to modify the initial alignment based on the incremental scan, and (b) defining an updated set of correspondence maps. The updated set of correspondence maps correlates sample points in the plurality of scans to sample points in the incremental scan. In some cases the system further comprises a three-dimensional scanner configured to acquire the plurality of scans and store the resulting sample points in the memory device. In some cases the system further comprises a display device configured to visually render at least a portion of the sample points in one of the plurality of collections of sample points, wherein the rendered sample points are translated based on a corresponding deformation function. In some cases (a) updating the initial set of deformation parameters further comprises saving a modified set of deformation parameters in the memory device; and (b) the scan alignment process further comprises storing the updated set of correspondence maps in the memory device. In some cases (a) updating the initial set of deformation parameters further comprises saving a modified set of deformation parameters in the memory device; (b) the scan alignment process further comprises displaying a global non-rigid alignment of the plurality of scans and the incremental scan; and (c) the global non-rigid alignment is displayed using the modified set of correspondence maps and the modified set of deformation parameters. In some cases the scan alignment process further comprises stitching together sample points comprising the plurality of scans and the incremental scan to produce a global non-rigid alignment of the plurality of scans and the incremental scan. In some cases each of the deformation functions is a linear function based on a corresponding one of the deformation parameters. In some cases (a) concurrently (i) updating the initial set of deformation parameters and (ii) defining the updated set of correspondence maps comprises solving Equation (6); (b) the plurality of scans includes N scans; (c) $M_{ij}^*$ represents a correspondence map correlating sample points in an ith scan with sample points in a jth scan, $1 \leq i < j \leq N$; (d) $\epsilon_i(M_{i,N+1}, \theta_i)$ represents a unitary alignment energy that corresponds to a sum of distances between (i) sample points that comprise the ith scan and that are transformed by a deformation function defined for the ith scan, and (ii) sample points correlated by a correspondence map $M_{i,N+1}$; (e) $f^2(\theta_i)$ represents a deformation energy that penalizes non-rigid deformation of the deformation function defined for the ith scan; (f) $\lambda$ is a weight of the deformation energy; (g) $\epsilon_{ij}(M_{ij}^*, \theta_i, \theta_j)$ is defined by Equation (5); (h) an ith one of the plurality of deformation functions is defined by $T_i(s; \theta_i^*) = w_i(s) \theta_i^* + p_i(s)$; (i) s is a selected sample point comprising the ith scan; (j) $w_i(s)$ is a deformation weight of sample point s; (k) $p_i(s)$ is a three-dimensional position of sample point s; and (l) $\theta_i^*$ is a deformation parameter associated with the ith deformation function.

Another example embodiment provides a computer program product encoded with instructions that, when executed by one or more processors, causes an incremental global non-rigid alignment process to be carried out. The process comprises acquiring a plurality of scans. each of the plurality of scans characterizes a portion of the three-dimensional subject. Each of the plurality of scans comprises a collection of sample points. The process further comprises defining an initial set of correspondence maps. The initial set correlates sample points included in the plurality of scans. The process further comprises defining an initial set of deformation parameters that align the plurality of scans according to a plurality of deformation functions. The initial set of correspondence maps and the initial set of deformation parameters collectively define an initial alignment of the plurality of scans. The process further comprises acquiring an incremental scan that comprises an incremental collection of sample points. The process further comprises concurrently (a) updating the initial set of deformation parameters to modify the initial alignment based on the incremental scan, and (b) defining an updated set of correspondence maps. The updated set of correspondence maps correlates sample points in the plurality of scans to sample points in the incremental scan. In some cases the process further comprises (a) storing the initial set of correspondence maps in a storage repository; and (b) storing the updated set of correspondence maps in the storage repository without modifying the initial set of correspondence maps. In some cases the process further comprises \stitching together the plurality of scans and the incremental scan to produce a global non-rigid alignment of the plurality of scans and the incremental scan. In some cases the plurality of scans and the incremental scan are acquired from a storage repository selected from a group consisting of a local image repository and a networked image repository.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A computer-implemented method for aligning multiple scans of a three-dimensional subject, the method comprising:

acquiring a plurality of scans, each of which characterizes a portion of the three-dimensional subject, and each of which comprises a collection of sample points;

defining an initial set of correspondence maps, the initial set correlating sample points included in the plurality of scans;

defining an initial set of deformation parameters that align the plurality of scans according to a plurality of deformation functions, wherein the initial set of correspondence maps and the initial set of deformation parameters collectively define an initial alignment of the plurality of scans;

acquiring an incremental scan that comprises an incremental collection of sample points; and concurrently (a) updating the initial set of deformation parameters to modify the initial alignment based on the incremental scan, and (b) defining an updated set of correspondence maps, the updated set of correspondence maps correlating sample points in the plurality of scans to sample points in the incremental scan.

2. The method of claim 1, wherein:

concurrently (a) updating the initial set of deformation parameters and (b) defining the updated set of correspondence maps comprises solving for $$\operatorname*{argmin}_{\substack{\theta_1,\ldots,\theta_N \\ M_{1,N+1},\ldots,M_{N,N+1}}} \sum_{i=1}^{N} (\varepsilon_i(M_{i,N+1},\theta_i) + \lambda f^2(\theta_i)) + \sum_{1 \leq i < j \leq N} \varepsilon_{ij}(M_{ij}^*, \theta_i, \theta_j);$$

the plurality of scans includes N scans;

$M_{ij}^*$ represents a correspondence map correlating sample points in an ith scan with sample points in a jth scan, $1 \leq i < j \leq N$;

$\epsilon_i(M_{i,N+1}, \theta_i)$ represents a unitary alignment energy that corresponds to a sum of distances between (a) sample points that comprise the ith scan and that are transformed by a deformation function defined for the ith scan, and (b) sample points correlated by a correspondence map $M_{i,N+1}$;

$f^2(\theta_i)$ represents a deformation energy that penalizes non-rigid deformation of the deformation function defined for the ith scan;

λ is a weight of the deformation energy; and $\epsilon_{ij}(M_{ij}^*, \theta_i, \theta_j)$ is a pairwise alignment energy that enforces the correspondence maps $M_{ij}^*$ between the N scans.

3. The method of claim 1, wherein the initial set of correspondence maps minimizes an overall alignment error between pairings of the plurality of scans.

4. The method of claim 1, wherein:
the plurality of scans and the incremental scan are acquired using a three-dimensional scanner configured to scan the three-dimensional object; and
each of the sample points in each of the collections of sample points is a three-dimensional sample point.

5. The method of claim 1, wherein:
the initial set of deformation parameters are saved in a memory; and
updating the initial set of deformation parameters further comprises saving a modified set of deformation parameters in the memory.

6. The method of claim 1, wherein:
an ith one of the plurality of deformation functions is defined as $$T_i(s, \theta_i^*) = w_i(s)\theta_i^* + p_i(s);$$

s is a selected sample point comprising an ith scan;
$w_i(s)$ is a deformation weight of sample point s;
$p_i(s)$ is a three-dimensional position of sample point s; and
$\theta_i^*$ is a deformation parameter associated with the ith deformation function.

7. The method of claim 1, wherein the plurality of scans and the incremental scan are acquired simultaneously.

8. The method of claim 1, wherein
the plurality of scans includes N scans;
acquiring the incremental scan comprises acquiring an (N+1)th scan;
updating the initial set of deformation parameters results in N updated deformation parameters; and
the method further comprises:
acquiring a second (N+2)th incremental scan that comprises an (N+2)th incremental collection of sample points; and
concurrently (a) further updating each of the N updated deformation parameters based on alignment of sample points comprising each of the (N+1) scans with the (N+2)th incremental collection of sample points, and (b) defining a second updated set of correspondence maps, the second updated set correlating sample points in the (N+1) scans to sample points in the (N+2)th incremental scan.

9. An incremental global non-rigid alignment system that comprises a memory device and a processor that is operatively coupled to the memory device, wherein the processor is configured to execute instructions stored in the memory device that, when executed, cause the processor to carry out a scan alignment process comprising:
acquiring a plurality of scans, each of which characterizes a portion of the three-dimensional subject, and each of which comprises a collection of sample points;
defining an initial set of correspondence maps, the initial set correlating sample points included in the plurality of scans;
defining an initial set of deformation parameters that align the plurality of scans according to a plurality of deformation functions, wherein the initial set of correspondence maps and the initial set of deformation parameters collectively define an initial alignment of the plurality of scans;
acquiring an incremental scan that comprises an incremental collection of sample points; and
concurrently (a) updating the initial set of deformation parameters to modify the initial alignment based on the incremental scan, and (b) defining an updated set of correspondence maps, the updated set of correspondence maps correlating sample points in the plurality of scans to sample points in the incremental scan.

10. The system of claim 9, further comprising a three-dimensional scanner configured to acquire the plurality of scans and store the resulting sample points in the memory device.

11. The system of claim 9, further comprising a display device configured to visually render at least a portion of the sample points in one of the plurality of collections of sample points, wherein the rendered sample points are translated based on a corresponding deformation function.

12. The system of claim 9, wherein:
updating the initial set of deformation parameters further comprises saving a modified set of deformation parameters in the memory device; and
the scan alignment process further comprises storing the updated set of correspondence maps in the memory device.

13. The system of claim 9, wherein:
updating the initial set of deformation parameters further comprises saving a modified set of deformation parameters in the memory device;
the scan alignment process further comprises displaying a global non-rigid alignment of the plurality of scans and the incremental scan; and
the global non-rigid alignment is displayed using the modified set of correspondence maps and the modified set of deformation parameters.

14. The system of claim 9, wherein the scan alignment process further comprises stitching together sample points comprising the plurality of scans and the incremental scan to produce a global non-rigid alignment of the plurality of scans and the incremental scan.

15. The system of claim 9, wherein each of the deformation functions is a linear function based on a corresponding one of the deformation parameters.

16. The system of claim 9, wherein:
concurrently (a) updating the initial set of deformation parameters and (b) defining the updated set of correspondence maps comprises solving for $$\underset{\substack{\theta_1, \ldots, \theta_N \\ M_{1,N+1}, \ldots, M_{N,N+1}}}{\operatorname{argmin}} \sum_{i=1}^{N} (\varepsilon_i(M_{i,N+1}, \theta_i) + \lambda f^2(\theta_i)) + \sum_{1 \leq i < j \leq N} \varepsilon_{ij}(M_{ij}^*, \theta_i, \theta_j);$$

the plurality of scans includes N scans;
$M_{ij}^*$ represents a correspondence map correlating sample points in an ith scan with sample points in a jth scan, $1 \leq i < j \leq N$;
$\epsilon_i(M_{i,N+1}, \theta_i)$ represents a unitary alignment energy that corresponds to a sum of distances between (a) sample points that comprise the ith scan and that are transformed by a deformation function defined for the ith scan, and (b) sample points correlated by a correspondence map $M_{i,N+1}$;
$f^2(\theta_i)$ represents a deformation energy that penalizes non-rigid deformation of the deformation function defined for the ith scan;
λ is a weight of the deformation energy;

$$\varepsilon_{ij}(M_{ij}^*, \theta_i, \theta_j) = \sum_{(s_k, t_k) \in M_{ij}^*} \|T_i(s_k; \theta_i) - T_j(t_k; \theta_j)\|^2;$$

an ith one of the plurality of deformation functions is defined as $$T_i(s, \theta_i^*) = w_i(s)\theta_i^* + p_i(s);$$

s is a selected sample point comprising the ith scan;
$w_i(s)$ is a deformation weight of sample point s;
$p_i(s)$ is a three-dimensional position of sample point s; and
$\theta_i^*$ is a deformation parameter associated with the ith deformation function.

17. A non-transitory computer program product encoded with instructions that, when executed by one or more processors, causes an incremental global non-rigid alignment process to be carried out, the process comprising:
acquiring a plurality of scans, each of which characterizes a portion of the three-dimensional subject, and each of which comprises a collection of sample points;
defining an initial set of correspondence maps, the initial set correlating sample points included in the plurality of scans;
defining an initial set of deformation parameters that align the plurality of scans according to a plurality of deformation functions, wherein the initial set of correspondence maps and the initial set of deformation parameters collectively define an initial alignment of the plurality of scans; acquiring an incremental scan that comprises an incremental collection of sample points; and
concurrently (a) updating the initial set of deformation parameters to modify the initial alignment based on the incremental scan, and (b) defining an updated set of correspondence maps, the updated set of correspondence maps correlating sample points in the plurality of scans to sample points in the incremental scan.

18. The non-transitory computer program product of claim 17, wherein the process further comprises:
storing the initial set of correspondence maps in a storage repository; and
storing the updated set of correspondence maps in the storage repository without modifying the initial set of correspondence maps.

19. The non-transitory computer program product of claim 17, wherein the process further comprises stitching together the plurality of scans and the incremental scan to produce a global non-rigid alignment of the plurality of scans and the incremental scan.

20. The non-transitory computer program product of claim 17, wherein the plurality of scans and the incremental scan are acquired from a storage repository selected from a group consisting of a local image repository and a networked image repository.

* * * * *